(12) United States Patent
Johnson et al.

(10) Patent No.: US 6,257,599 B1
(45) Date of Patent: Jul. 10, 2001

(54) BEACH TOTE-SLED ASSEMBLY KIT

(76) Inventors: Leigh Johnson, 912 Knollwood Ct., Plainfield, NJ (US) 07962; Stanley I. Mason, Jr., 61 River Rd., Weston, CT (US) 06880

( * ) Notice: Subject to any disclaimer, the term of this patent is extended or adjusted under 35 U.S.C. 154(b) by 0 days.

(21) Appl. No.: 09/496,543

(22) Filed: Feb. 2, 2000

(51) Int. Cl.$^7$ ..................................................... B62B 13/18
(52) U.S. Cl. ............................... 280/8; 280/28; 280/47.34
(58) Field of Search ................................. 280/7.12, 8, 9, 280/10, 28, 20, 24, 43.14, 43.22, 43.24, 47.34, 47.35, 12.14, 12.1, 12.13, 14.1

(56) References Cited

U.S. PATENT DOCUMENTS

| | | | | |
|---|---|---|---|---|
| 369,224 | * | 8/1887 | Batchelder | 280/12.13 |
| 597,468 | * | 1/1898 | Lockwood | 280/12.13 |
| 1,445,781 | * | 2/1923 | Marheine | 280/43.14 |
| 3,429,582 | * | 2/1969 | Embry | 280/7.12 |
| 3,506,279 | * | 4/1970 | Lambert | 280/14.1 |
| 3,912,290 | * | 10/1975 | Rich | 280/9 |
| 4,139,208 | * | 2/1979 | Kaley et al. | 280/9 |
| 4,294,457 | * | 10/1981 | Thiboutot | 280/20 |
| 4,537,412 | * | 8/1985 | Hill | 280/14.1 |
| 4,863,075 | * | 9/1989 | Romer | 280/8 X |
| 5,090,714 | * | 2/1992 | Seekins et al. | 280/24 |
| 5,480,170 | * | 1/1996 | Kaiser, II | 280/47.34 X |
| 5,897,131 | * | 4/1999 | Brown et al. | 280/7.12 |
| 5,941,541 | * | 8/1999 | Minkus | 280/20 |
| 6,042,122 | * | 3/2000 | Mohr | 280/9 |

FOREIGN PATENT DOCUMENTS

| | | | |
|---|---|---|---|
| 1023333 | * | 1/1958 | (DE) . |
| 2405665 | * | 8/1974 | (DE) . |
| 72888 | * | 12/1947 | (NO) . |
| 87264 | * | 4/1956 | (NO) . |

* cited by examiner

*Primary Examiner*—Brian L. Johnson
*Assistant Examiner*—Brian Fischmann
(74) *Attorney, Agent, or Firm*—St. Onge Steward Johnston & Reens LLC

(57) ABSTRACT

A tote-sled assembly includes spaced runners adapted to slide along malleable and hardened surfaces and having separate parts that are assembled in an end to end relationship and are overlapped by a detachable connector. The tote-sled assembly further includes a plurality of toothed wheels and detachable vertical struts adapted to reduce the overall size of a partially disassembled assembly.

16 Claims, 2 Drawing Sheets

BEACH TOTE-SLED ASSEMBLY KIT

FIELD OF THE INVENTION

This invention is related to a carrier adapted to be conveniently assembled and disassembled. More particularly, the invention relates to a tote-sled assembly which can be easily displaced along malleable and hardened surfaces.

BACKGROUND OF THE INVENTION

Various carriers, carts, wheel chairs and portable sleds are known as aids to personal mobility and likely include the following key functional elements: light weight, compact size, and versatile use.

Prior configurations of carts have been largely impractical with unstable rolling dynamics. Their use has been limited to use on flat, smooth and hard surfaces. Very few attempts have been made to provide compensation for irregular, soft surfaces, while remaining stable over a rolling speed range from walking pace to that of a jogging pace.

Even fewer attempts have been directed to portable assemblies adapted to be used as a sled-wagon combination, such as a tote-sled assembly. This type of portable carrying assembly is particularly convenient during summer time when parents bring their small children to the sand beaches. Typically, the beaches are wide and people, preferring to stay near the water, have to walk substantial distances. Having a toddler, bags filled with different beach paraphernalia, and the like makes such trips burdensome. Known tote-assemblies are typically equipped with small wheels which are totally useless on sand or even on uneven sandy roads of the countryside.

U.S. Pat. No. 5,222,748 to Johnson discloses a structure that is designed to overcome the above-discussed problems. Specifically, this patent discloses a portable kit including a pair of runners shaped to slide upon a soft surface, a pair of rigid connectors serving as axles for rotatable wheels and an upright frame that is detachably mounted on the runners.

The above described structure can be successfully used on both hardened and soft surfaces, although the wheels having a smooth periphery may have a problem of engaging an uneven surface thereby complicating displacement of the structure.

While the disclosed structure is portable and can be relatively easy to disassemble, the overall size of the disassembled structure is still substantial enough to take up a space when loaded in a trunk. Particularly, a length of the runners that can be a few feet long may be problematic in a limited space of a car trunk, which is typically small.

Also, since separate parts are typically screwed to one another, it may take some time to completely disassemble the structure disclosed in Johnson. As a consequence, the height of this structure may create additional problems.

What is desired, therefore, is a tote-sled assembly that can be effectively used both on malleable and hardened surfaces. Providing a tote-sled assembly that can be disassembled in a time-efficient manner to fit the interior of a car trunk is also desired, as is a tote-sled assembly, which has parts, characterized by a small size upon complete disassemblage.

SUMMARY OF THE INVENTION

This is achieved by provision of a tote-sled assembly including a frame having a plurality of two pairs of struts which form spaced uprights detachably mounted on spaced runners. Each of the runners is comprised of separate parts that are positioned in an edge to edge relation and held together by a connector.

Preferably, the connector has the same shape as the runners and is sized to slide along them to overlap the separate parts thereby holding them aligned. Upon complete disassemblage of the tote-sled assembly, it is possible to even further reduce a size of each runner. Advantageously, each connector is provided with a recess extending between its opposite ends to allow the connector to laterally expand upon applying an external force. Thus, the runners may have outer dimensions that are slightly greater than inner dimensions of the connectors, which provides a reliable continuous contact between adjacent surfaces upon inserting the parts into the connector.

Also preferably, each vertical strut is a multi-part detail including an upper and lower stretch. One of the stretches has a pocket formed with an inwardly extending lip snapping over a projection which is provided on an end of the other stretch upon pulling these stretches toward one another. As a result, without completely disassembling the structure, the height of the assembly can be substantially reduced.

It is therefore an object of the invention to provide a tote-sled assembly overcoming the drawbacks of the prior art.

Still another object of the invention is to provide a tote-sled assembly that can be easily assembled and disassembled without use of any hand actuating tools.

Yet another object of the invention is to provide a tote-sled assembly which has relatively long separate parts that can be further disassembled so as to reduce their length.

Another object of the invention is to provide a tote-sled assembly that can be partially disassembled to a size that allows the assembly to be placed in a limited space.

Still another object of the invention is to provide a tote-sled assembly that can be effectively used both on malleable and hardened surfaces.

DETAILED DESCRIPTION OF THE DRAWINGS

Figure 1:
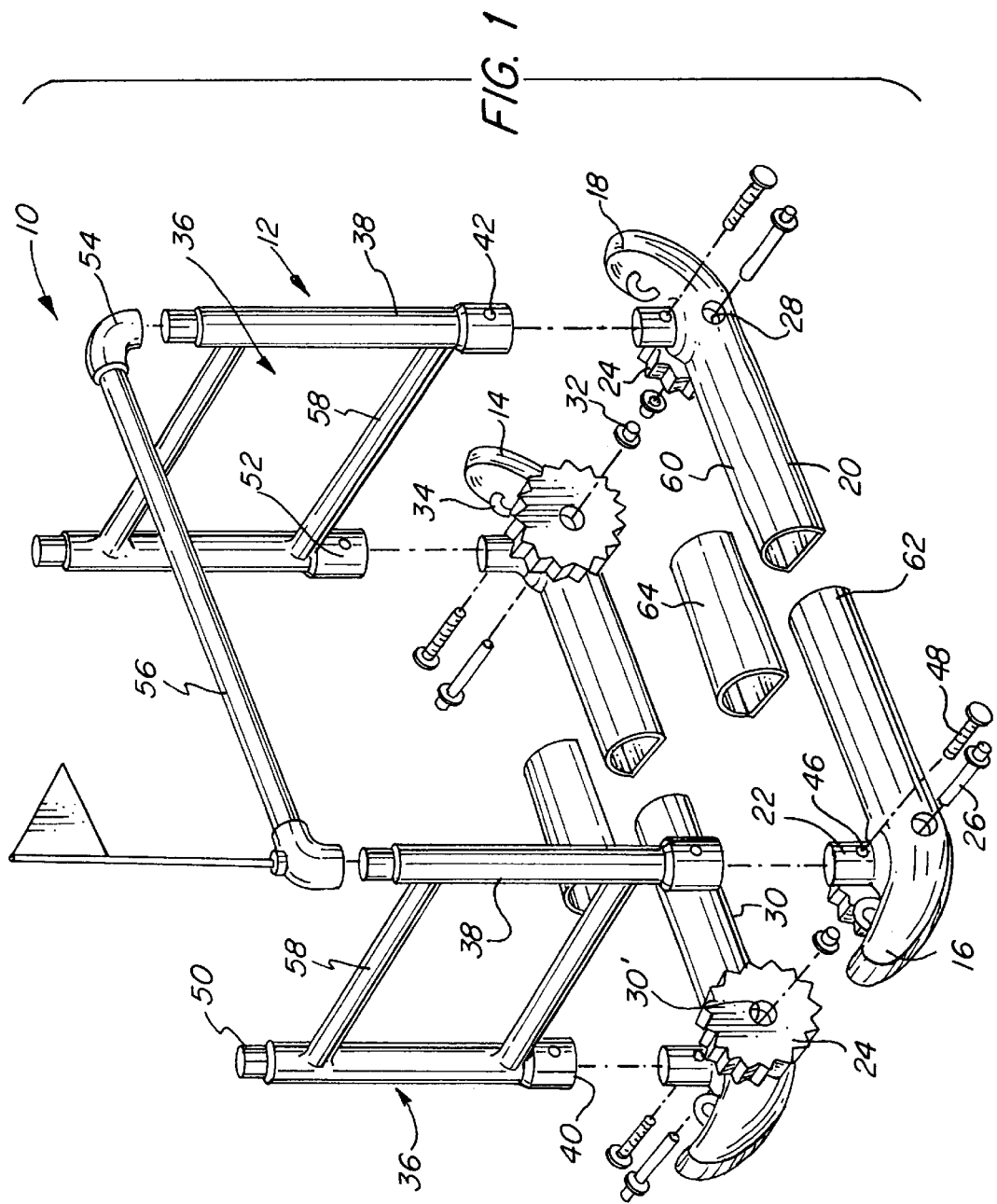
FIG. 1 is an exploded view of a tote-sled assembly according to the invention.

The foregoing is achieved by the present invention as illustrated in FIGS. 1–4. Referring to FIG. 1, a sled-tote assembly 10 includes a modular frame 12 that by virtue of its name includes a variety of connectable parts. Particularly, each of the two runners 14 constituting a base of the assembly has opposite raised end regions 16, 18 that are bridged by a slider 20. The slider is formed with two spaced studs 22, each of which is located close to the end region 16, 18, and has spaced eyelets 34 located at the end regions 16, 18 for receiving a rope that is held by a user to stir the assembly. At the base of each of the end regions 16, 18 each runner has a thoroughgoing hole 28 receiving a fastener 26 which connects the runner with wheels 24.

According to one aspect of the invention, each wheel 24 is formed with a toothed periphery. Providing a plurality of teeth, as illustrated in FIG. 1, enhances contact between the wheels and a surface. Whether the assembly is driven on a malleable surface or on a hardened one, each tooth increases the engaging surface thereby helping a user to push the assembly. Adjacent teeth form a groove that may be up to 1.5" deep. Preferably, an angle between teeth does not exceed 90°.

As mentioned above, the fastener 26 extending through the hole 28 of the runner receives the wheel 24 that is formed with a central opening 30. Screwed on an inner end of the fastener is a nut 32 that completes a wheel assembly. The fastener can be selected from the group including a screw, a pin and the like and has threaded ends and a diameter which is somewhat less than a diameter of the central opening 30' of the wheel thereby providing a certain degree of maneuverability of the tote-sled assembly.

Figures 2, 3, 4:
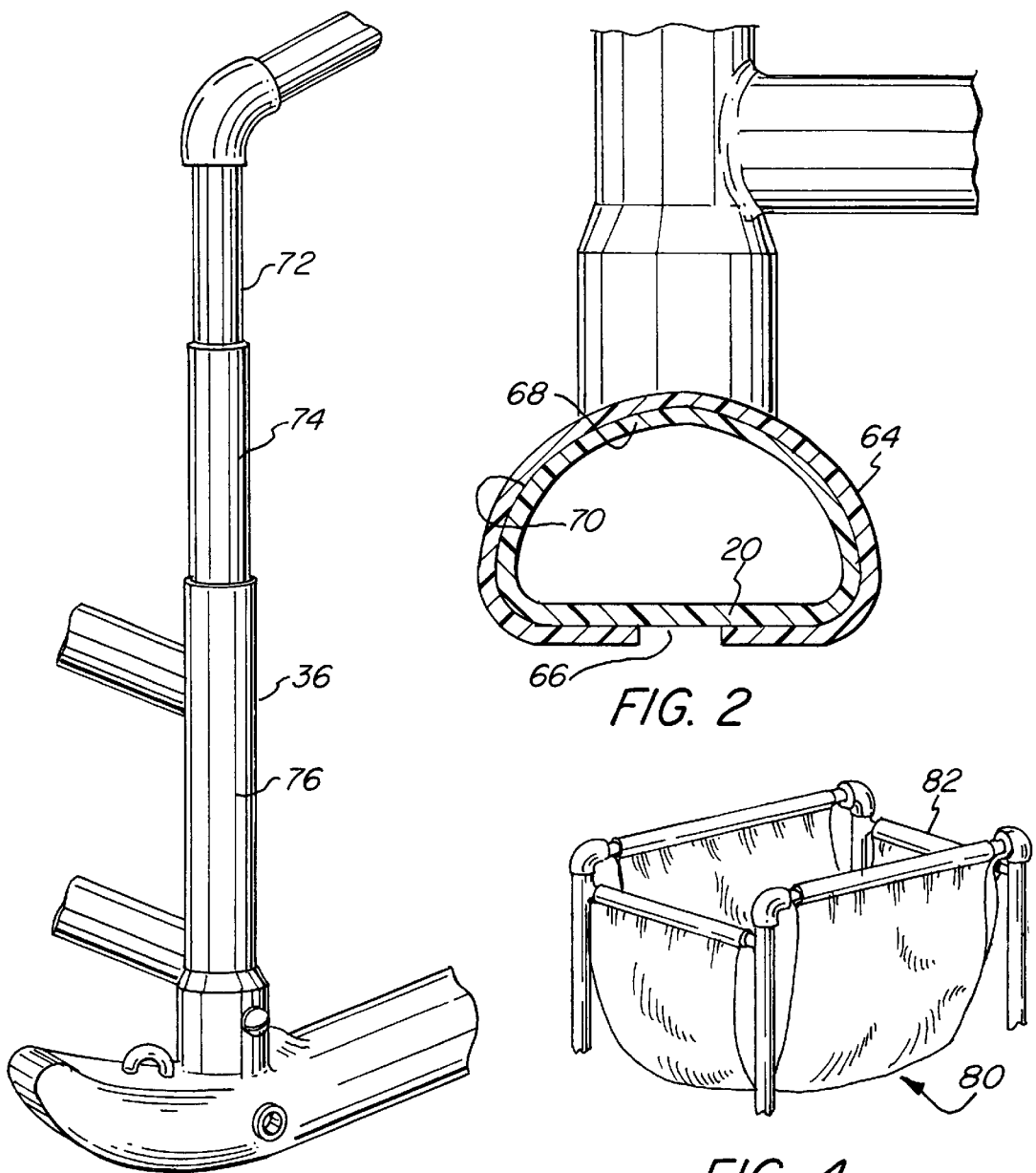
FIG. 2 is a cross-sectional view of a runner of the tote-sled assembly shown in FIG. 1.
FIG. 3 is an isometric view of a vertical strut in accordance with another embodiment of the invention shown in FIG. 1.
FIG. 4 is an isometric view of a canvas sling according to invention shown in FIG. 1.

The assembly further includes two uprights 36 connecting ends of the rails and serving as a means for receiving a canvas sling 80 (FIG. 4). Each upright is a rigid structure including a pair of vertical struts 38, each having a bottom region 52 formed with a pocket 40 that is formed with a diameter sufficient to receive the stud 22. As seen in the drawings, the bottom region is formed with outer dimensions that are greater than the rest of the strut and has a thoroughgoing hole 42, which, upon alignment with a hole 46 of the strut 22, receives a fastener 48. Similar to the fastener 26, the fastener 48 can be a pin, a screw or a bolt. A single criterion applied to both fasteners 26 and 48 is that they provide an easy assembly and disassembly of the connectable parts. As is understood, the stud 22 can have different dimensions and be formed with a pocket that receives the bottom region 52 of the strut.

An upper region 50 of each strut also may have different dimensions, but in the preferred embodiment shown in FIG. 1, the upper region has a decreased diameter receiving one of the recessed arms of an angled connector 54. The other arm of the connector receives a horizontal bar 56 which rigidly connects the uprights. For the sake of clarity, only one of the horizontal bars is illustrated. The other bar is identical to the one that is shown and connects the other struts of the uprights.

In addition to the horizontal bars 56, each upright is reinforced by a pair of spaced crossbars 58 that may be formed as separate parts, but in the shown embodiment are formed unitarily with the struts.

In accordance with another aspect of the invention, each of the sliders is formed as a multipart detail. Specifically, two parts 60 and 62 of the slider 20 are positioned in an edge to edge relationship during assembly. A connector 64 shaped and sized to slide along the slider is displaceable along it to overlap both parts thereby preventing lateral displacement of the parts 60, 62 relative to each other.

Referring to FIG. 2, the connector may be formed with a recess 66 extending between its opposite ends. Considering the fact that the whole structure is made of a light material, preferably plastic, it is possible to spread out the recessed bottom of the connector and pull it out off of the slider 20 without completely disassembling the sled. Although removing the connector 64 does not allow the sled to be folded, it may, nevertheless, give it a certain degree of flexibility. Such flexibility enhancing compactness of the entire structure by simply forcing the remaining assembling parts any which way a user wishes while loading the assembly in the, car's trunk or passenger's compartment. It is understood, that the connector may have a continuous periphery which will allow the user to remove it by completely disassembling the sled in order to have the runners separated from the rest of the structure.

As seen in FIG. 2, an inner surface 68 of the connector 64 substantially conforms to an outer surface 70 of the runner. Due to inherent elasticity of plastic, the inner surface 68 of the connector tends to press against the outer surface 70 and, thus, having slightly smaller dimensions than the runner's outer surface, is able to provide reliable continuous contact with it during assembly of the runner. Clearly, a shape of the runner can vary and may include trapezoidal, circular, rectangular, semicircular or triangular shapes.

According to another aspect of the invention, the struts 38 may include a telescopic structure having a plurality of separate parts 72, 74 and 76 that are easily detachable to reduce a length of the struts. This feature is particularly advantageous when a user has sufficient room in the car's trunk but still cannot fit the assembly into it because of the vertical dimensions. By simply removing one of the telescopic parts, a user can easily place the assembly in the car.

FIG. 4 illustrates the canvas sling 80 of the assembly that is preferably made of a single piece of fabric and is provided with a sleeves 82 that can be easily stitched around the crossbars 58 and horizontal bars 56 to provide safe transportation of a toddler or cargo in the assembly.

Various changes in the details, materials and arrangement of parts which have been herein described and illustrated in order to explain the nature of this invention may be made by those skilled in the art within the principle and scope of the invention as expressed in the following claims.

What is claimed is:

1. A tote-sled assembly comprising:

a modular frame;

two spaced apart sled runners supporting said modular frame, each having separate parts detachably connected with one another, so as to reduce the overall dimensions of said modular frame in a disassembled state thereof, each runner being formed with opposite end regions and a respective outer surface;

a plurality of connectors, each having opposite ends, which receive the separate parts of the respective runner, and being made of elastically deformable material, each connector further having an inner surface substantially conforming to the outer surface of the respective runner and being in continuous contact with the parts of the runner inserted in the connector in an assembled state of the tote-sled assembly; and a canvas sling removably attached to the modular frame.

2. The tote-sled assembly defined in claim 1 wherein each runner and connector have substantially the same shape.

3. The tote-sled assembly defined in claim 2 wherein the shape is semi-circular and includes a generally flat bottom portion and a dome-shape top portion.

4. The tote-sled assembly defined in claim 2 wherein the shape is selected from the group including a trapezoidal shape and a cylindrical shape.

5. A tote-sled assembly comprising:

a modular frame;

two spaced apart sled runners supporting said modular frame, each having separate parts detachably connected with one another, so as to reduce the overall dimensions of said modular frame in a disassembled state thereof;

a plurality of connectors, each of the connectors having opposite ends, each receiving a respective part of the separate parts of the runner so as to secure these parts together in an assembled state of the modular frame, each of connectors being sized to allow the separate parts of the respective runner to frictionally slide against the connector toward one another;

a canvas sling removably attached to the modular frame.

6. The tote-sled assembly defined in claim 5 wherein the connector has a length less than a length of each of the separate parts of the runner.

7. A tote-sled assembly comprising:

a modular frame;

a canvas sling removably attached to the modular frame;

two spaced apart sled runners supporting said modular frame, each having separate parts detachably connected with one another, so as to reduce the overall dimensions of said modular frame in a disassembled state thereof; and a plurality of connectors, each of the connectors having opposite ends, each receiving a respective part of the separate parts of the runner so as to secure these parts together in an assembled state of the modular frame, each of the connectors having a bottom portion formed with an elongated slit which extends between opposite ends of the connector so as to allow the connector to laterally expand upon receiving the parts of the runner.

8. The tote-sled assembly defined in claim 1 wherein the modular frame includes two uprights, each bridging ;

a respective one of the runners to position the runners parallel to one another upon attaching the uprights, each upright having two spaced vertical struts interconnected by at least one reinforcing crossbar, each vertical strut being formed with a bottom end region detachably connected to the runner and a top end region.

9. The tote-sled assembly defined in claim 8 wherein the one crossbar is formed unitarily with the vertical struts.

10. The tote-sled assembly defined in claim 8 wherein each runner has a stud extending upwardly, the bottom end region of each vertical strut having a sleeve pocket receiving the stud.

11. The tote-sled assembly defined in claim 10 wherein the holes of the stud and the sleeve pocket are aligned upon insertion of the stud, the tote-sled assembly further comprising a fastener traversing the aligned holes to removably attach the vertical strut and the stud.

12. The tote-sled assembly defined in claim 8 wherein the top end region of each vertical strut has a reduced outer dimension, the tote-sled assembly further comprising two spaced bars extending between the uprights, and a plurality of connectors attaching the bars to the top end regions of the vertical struts, each of the connectors has a pair of arms extending at an angle with respect to one another and having openings which receive the upper end region of the vertical strut and an end of the bar, respectively.

13. The tote-sled assembly defined in claim 8 wherein each vertical strut has upper and lower separate parts telescopically connected with one another, the upper and lower parts being detached from one another to reduce the overall dimension of the assembly in the disassembled state of the assembly.

14. The tote-sled assembly defined in claim 13 wherein one of the lower and upper parts of the vertical strut is formed with a pocket receiving the other stretch.

15. A tote-sled assembly comprising:

a modular frame including two uprights;

two spaced apart sled runners supporting said modular frame, each having separate parts detachably connected with one another, so as to reduce the overall dimensions of said modular frame in a disassembled state thereof a plurality of toothed wheels operatively connected to the runners, each runner having a pair of spaced holes, each of the spaced holes being traversed by a pin which extends towards the other runner and an inner end detachably receiving the toothed wheel.

16. A tote-sled assembly comprising:

a modular frame;

a canvas sling removably attached to the frame;

two spaced apart sled runners for sliding atop a malleable surface and supporting said modular frame, each sled runner having separate parts detachably connected with one another, so as to reduce the overall dimension of said modular frame in a disassembled state thereof; and a plurality of spaced apart toothed wheels rotatably mounted on each runner and sized to extend below the runners for rolling across a hardened surface;

a pair of connectors, each being displaceably mounted on the runner between a connecting position, wherein the connector overlaps both separate parts, and a disconnecting position, wherein only one part is covered; each of the connectors having substantially the same shape as the runners and being formed with a slit extending between its opposite end, so that the connector can be discontinued upon applying an external force.

* * * * *